United States Patent [19]

O'Donnell

[11] Patent Number: 5,893,718
[45] Date of Patent: Apr. 13, 1999

[54] MATHEMATICAL BOARD GAME

[76] Inventor: Gary O'Donnell, 5972 Skyway, Paradise, Calif. 95969

[21] Appl. No.: 08/858,405

[22] Filed: May 19, 1997

[51] Int. Cl.[6] .................................................. G09B 19/22
[52] U.S. Cl. .......................... 434/128; 434/191; 434/209; 273/272
[58] Field of Search ............................ 434/128, 188, 434/191, 209; 273/272, 299

[56] References Cited

U.S. PATENT DOCUMENTS

| | | | |
|---|---|---|---|
| 3,267,590 | 8/1966 | Browning | 273/272 |
| 3,460,835 | 8/1969 | Crans | 273/272 X |
| 4,565,374 | 1/1986 | Pak | 273/272 |
| 5,314,190 | 5/1994 | Lyons | 273/272 |
| 5,338,203 | 8/1994 | Rheams | 273/272 X |

FOREIGN PATENT DOCUMENTS

| | | | |
|---|---|---|---|
| 1208246 | 2/1960 | France | 273/272 |
| 2658428 | 8/1991 | France | 273/272 |
| 1304882 | 1/1973 | United Kingdom | 273/272 |

*Primary Examiner*—Jeffrey A. Smith

[57] ABSTRACT

A mathematical game that can be played by two, three, or four players uses a fold-open playing board with a square marked playing surface. A number of spaced bonus squares radiate outwardly form a centrally positioned star. Player positions are marked along four edges of the playing board. Each player has a limited number of playing tiles drawn from a tile pool of 100. The tiles are approximately ¾ inch by ¾ inch square and ⅛ inch thick and are numbered one to zero on one side. A player draws eight tiles from the mixed tile pool number side down. Each tile is sized to fit over and cover one square on the game board playing surface. Tile positioning is started on the center star. Each player in his/her turn attempts to complete a mathematical equation using three or more of his/her tiles with tiles already on the board. Scoring is based on adding the tile numbers showing plus any double numbers on bonus squares. The equation is disregarded. Play ends when the 100 tiles have been drawn and used to fill out eight for each player or no player can complete a mathematical equation using his/her tiles. The score is added and the highest score wins.

3 Claims, 5 Drawing Sheets

MATHEMATICAL BOARD GAME

BACKGROUND OF THE INVENTION

1. Field of the Invention

This invention relates to board games. The present invention is particularly directed towards a mathematical board game. The device of this invention is presented as a fun learning tool for basic mathematics.

2. Description of the Prior Art

Although several games using mathematics as a game structure are seen in past art patents, no game disclosure seen had any of the features individually or in combination set forth in the following specifications relative to the present invention.

SUMMARY OF THE INVENTION

Therefore, in practicing my invention, I provide a game using mathematics as a principal part of playing the game. A fold open game board has a playing surface marked in squares. The squares are sized for each to be fully covered by a numbered tile. The tiles are flattened pieces approximately ¾×¾ inches square and approximately ⅛ in thick. The tiles are numbered on one side one through zero. Two to four players can play the game and a tile rack that holds up to eight tiles is provided for each player. 100 tiles mixed and having the numbered side down are presented to the players. To start the game, each player (2, 3, or 4) picks up one tile. The player with the highest numbered tile starts the game. The game start tiles are returned and mixed into the tile pile. Each player draws eight tiles starting with the player who had the highest number. The game is played clockwise starting with the first player. Each player draws eight tiles from the tile pile and places them so he/she can read the numbers in his/her tile rack. The players try to complete mathematical equations by placing three of more numbered tiles from their racks against numbered tiles on the game board. Certain squares on the playing surface provide double scoring of a tile placed on that square. The tile numbers can be added, subtracted, divided, etc., to obtain a mathematical total. The face value of the tiles plus any on double squares is added for each player's score for that round. The score for each round is kept on a score sheet. The official game rules are set forth in the specifications. Other rules agreed to by the players may be used. The game is completed when all the numbered tiles are used or when the game becomes locked up because no player has tiles that will complete a math total. Any player with remaining tiles subtracts them from his score. The player ending with the largest score is declared the winner.

As a principal object, the present invention provides a mathematical learning game that uses math principals for scoring the game.

Another object of the invention is to provide a mathematical game in which players exercise basic mathematical functions, plus, times, minus, to produce an equation with only the numbers used for scoring, not the equation.

A further object of my invention is to provide a mathematical game where players use basic math calculations with out relying on a calculator.

A still further object of the invention is to provide a game that can be played by two, three, or four players using a fold-open playing board with a square marked playing surface having bonus squares radiating outwardly from a center star on the playing surface and each player having a limited amount of playing tiles numbered one side to be placed in turn on the playing surface squares to produce a mathematical equation.

Other objects and the many advantages of the present invention will become apparent from reading descriptions of numbered parts in the specification and comparing them with like numbered parts shown in the included drawings.

DESCRIPTION OF THE PREFERRED EMBODIMENT

Figure 1:
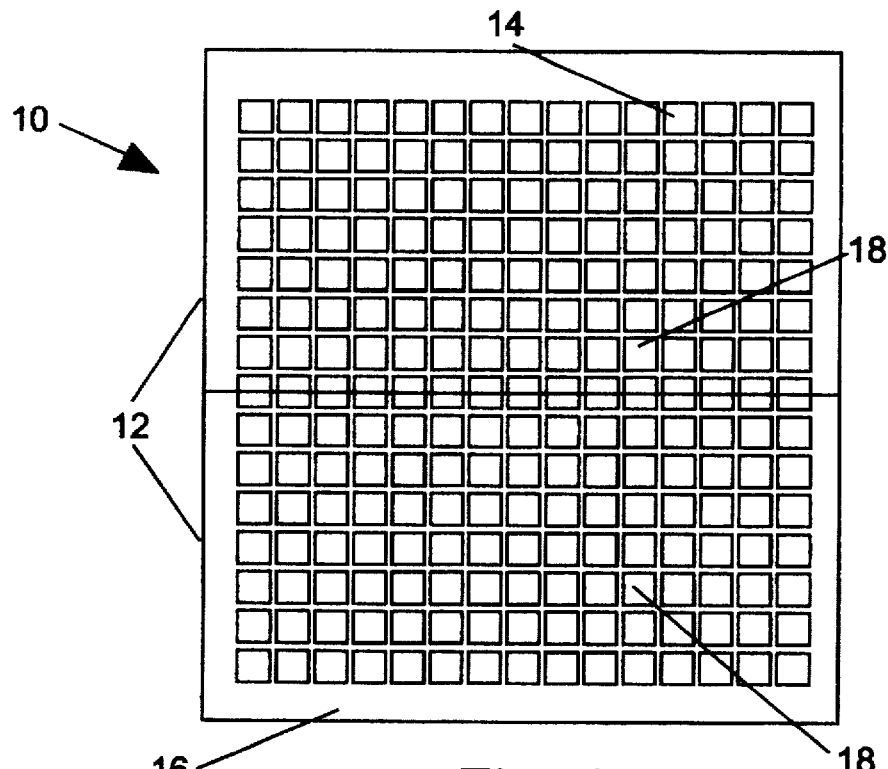
FIG. 1 shows a game board opened for play from the playing surface side in accordance with the invention.
Figure 2:
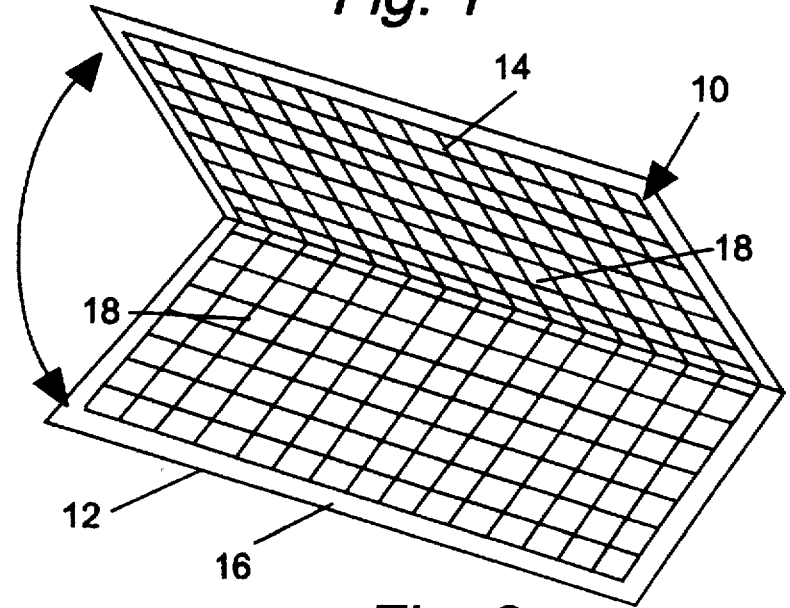
FIG. 2 shows the game board of FIG. 1 in the process of being folded.
Figure 3:
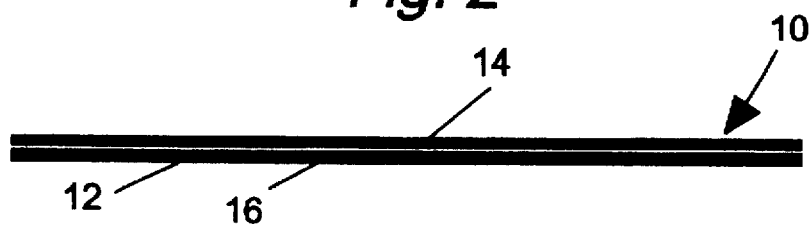
FIG. 3 shows the game board of FIG. 1 folded for storage.

Referring now to the drawings at FIGS. 1–3 where the principal parts of the invention are generally referenced as invention portions 10. In FIG. 1, game board 12, has a first fold section 14 and a second fold section 16 opened so square marked playing surface 18 can be used. In FIG. 2, game board 12 is shown being folded with playing surface 18 inside. In FIG. 3, game board 12 has been folded for storage with first fold section 14 on top of second fold section 16.

Figure 4:
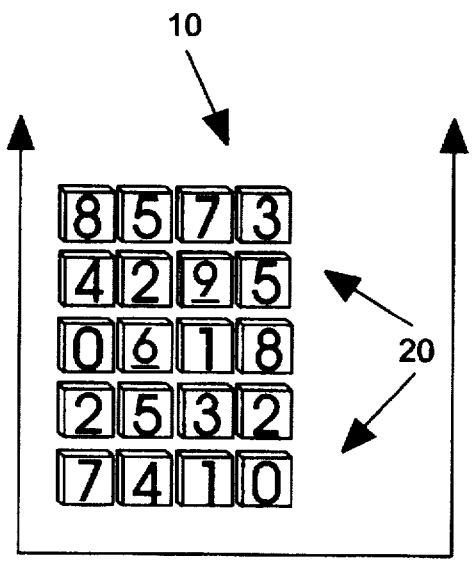
FIG. 4 shows tiles numbered 1 through 0 on one side used for playing the game of the present invention.
Figure 5:
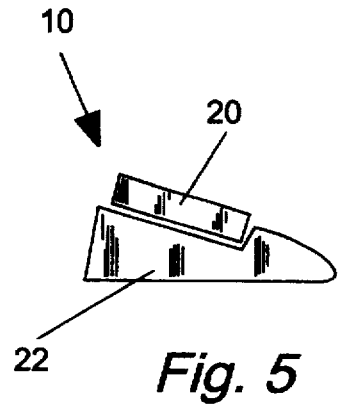
FIG. 5 is a side elevation view of a player's rack with a side view of a tile on the rack. Two to four players can play the game, each player has a rack. The racks hold eight tiles.
Figure 6:
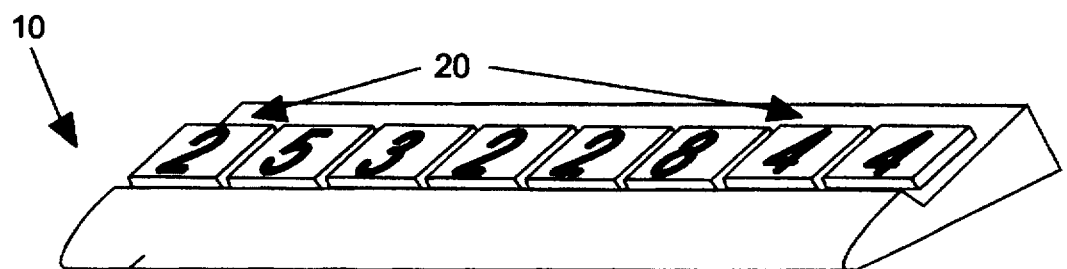
FIG. 6 is a perspective view of a tile rack holding eight tiles.

FIG. 4 shows tiles 20 numbered 1 through 0 on one side used for playing the game. Tiles 20 are approximately ¾×¾ inch square and ⅛ inch thick. Tiles 20 are sized to just cover the squares on playing surface 18 of game board 12. Two to four players can play the game, each player has a tile rack 22. Tile racks 22 are illustrated in a side elevation view in FIG. 5 and is a perspective view in FIG. 6. Each tile rack 22 holds up to eight numbered game tiles 20.

Figure 7:
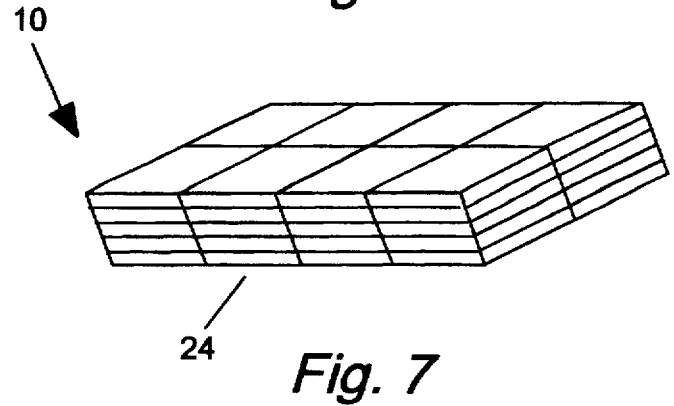
FIG. 7 shows an illustrative stack of tiles. In normal play, 100 tiles would be mixed and presented to the players with the number side down.
Figure 8:
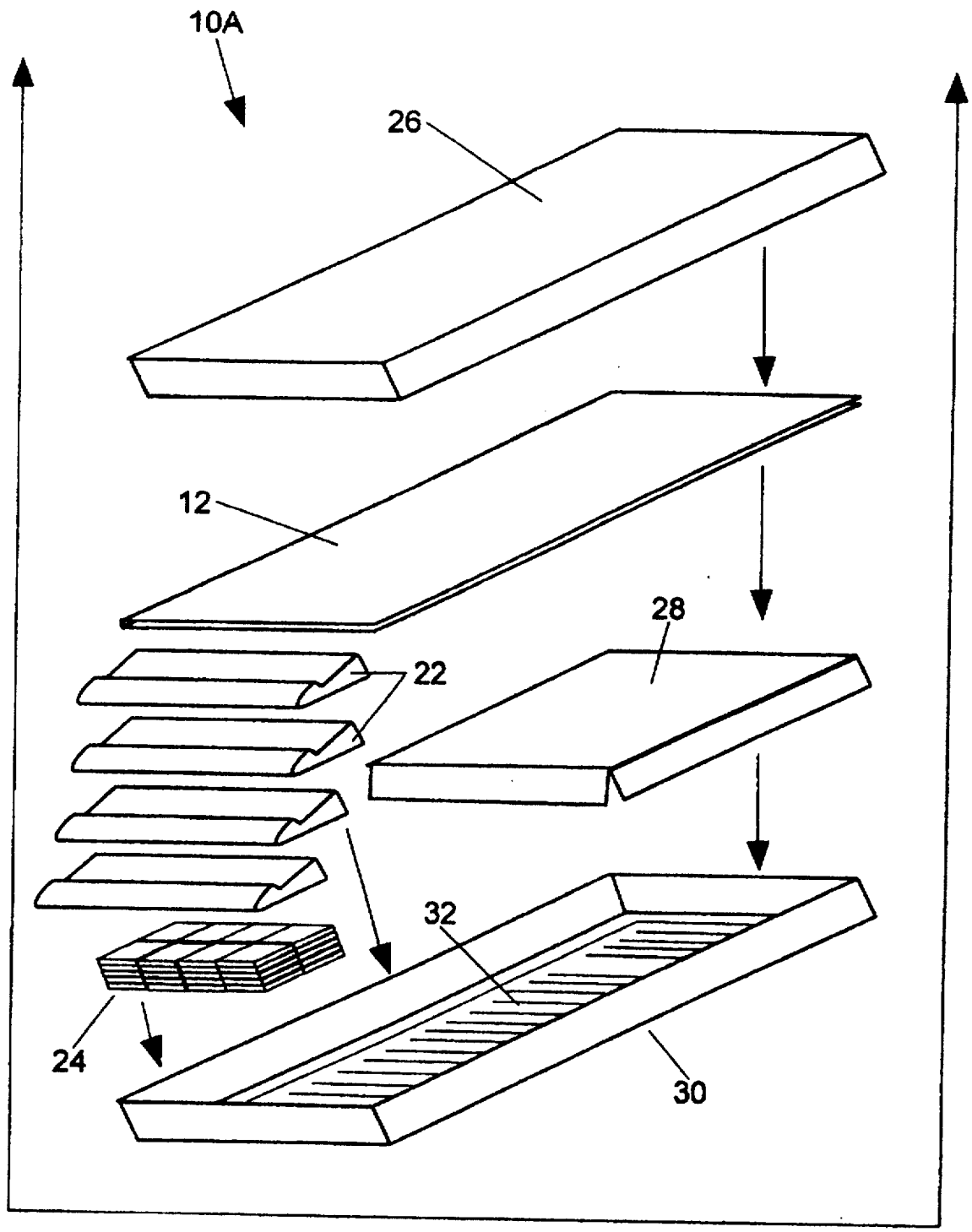
FIG. 8 shows the game parts, the box parts, and the rules in a perspective exploded view ready for assemblage.

FIG. 7 shows an illustrative stack of numbered game tiles 20. In normal play, 100 numbered game tiles 20 would be mixed and presented to the players with the number side down and the game would be played according to the rules described and illustrated in FIGS. 11 and 12. In FIG. 8, complete game parts, folded game board 12, stacked tiles 24, four tile racks 22, and game rules 32 are shown along with box lid 26, box divider 28, and box bottom 32 ready for packaging. The present invention is designated complete invention 10A in the FIG. 8 illustration.

Figure 9:
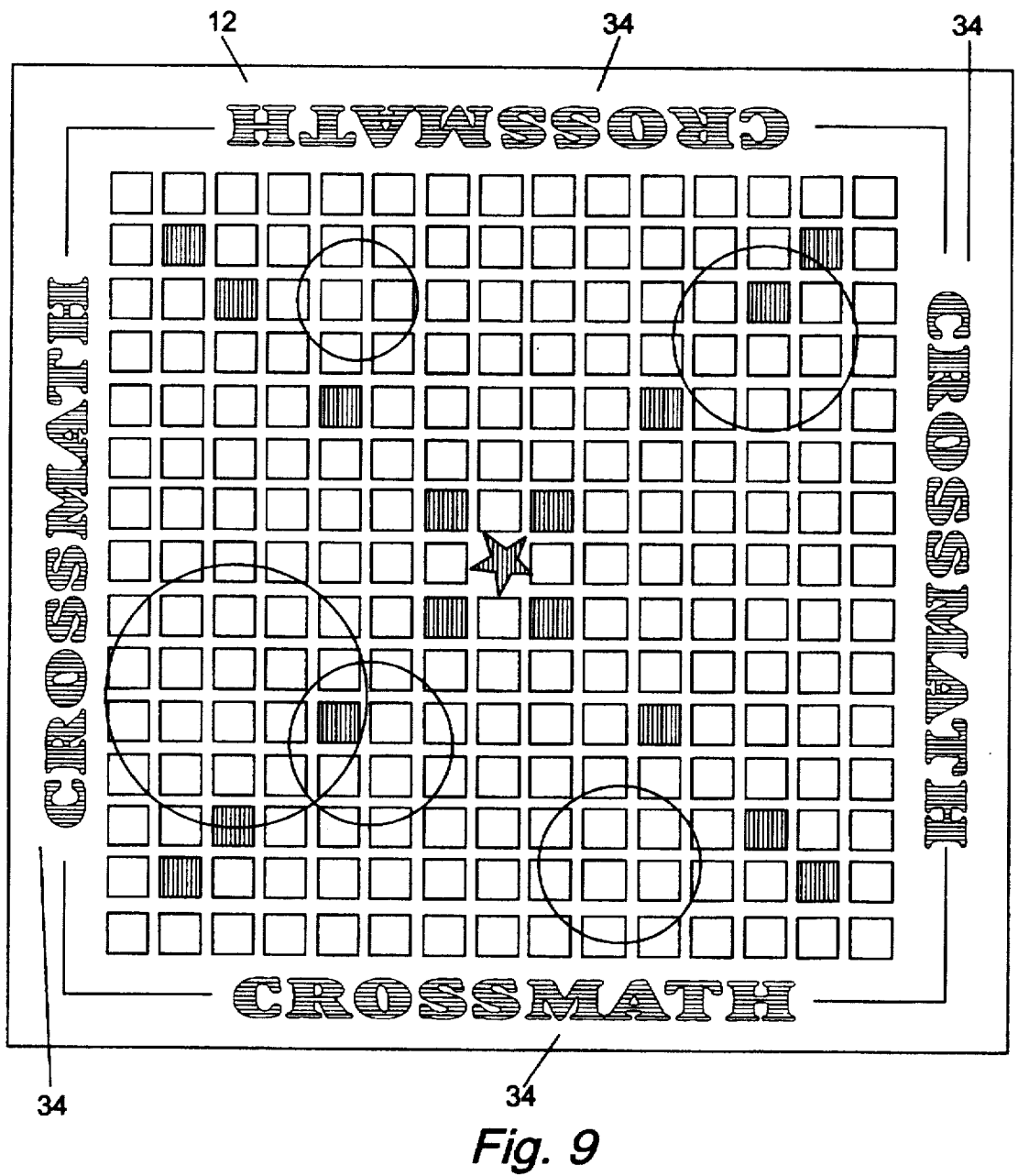
FIG. 9 shows the game board of the present invention in a top plan view of the playing surface in a black and white illustration.

FIG. 9 shows game board 12 in a top plan view. Playing surface 18 is in a black and white illustration. FIG. 9 shows the squared playing surface 18 of game board 12 with hatching to indicate colors in a top plan view. Coloring is vital to an understanding of the game according to the present invention as randomly positioned red squares allow a player to double the number amount shown on a tile 20 that can be positioned to fall on top of a red square. A blue star centered in playing surface 18 is the starting point of the game. Player positions 34 are adjacent the game name one on each of the four sides of game board 12.

Figure 10:
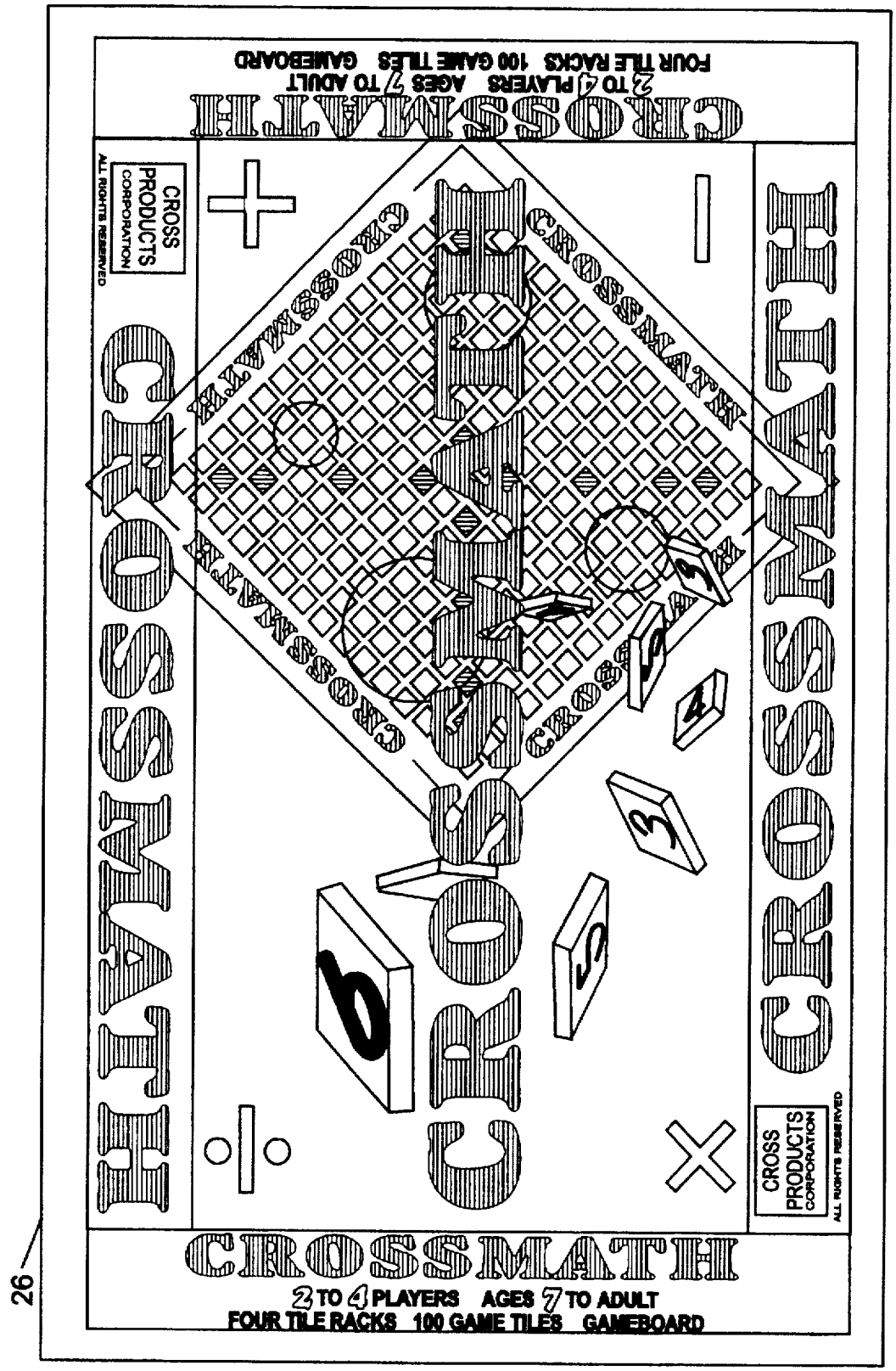
FIG. 10 shows the game box lid in a black and white illustration.

FIG. 10 shows game box lid 26 in a black and white illustration. Although the rules, hereinafter following, tell how to play the game of invention 10, called CROSSMATH, players are actually encouraged to make up their own rules if they wish. Regulation play rules 32 of CROSSMATH, include:

Two, three, or four players position themselves on the player designated sides 34 of the opened player board 12. Each player has a rack 22 that will hold eight of the tiles 20. Each player has a score sheet and a pencil for keeping his/her score (not part of the invention). 100 tiles 20 are used to play the game. Tiles 20 are printed with a number 0 through 9 on one wide side. Tiles 20 are placed number side down and shuffled around. Each player picks one tile 20 to see who will play first. The player who draws the highest number starts the game. Each player then picks up eight tiles 20, turns them over, and places them in their racks 22 with the number side up. The first player then decides what equation can be made from his/her tiles 20 and starts the game by placing the first tile 20 on the star in the center of the gameboard 22 then adding two or more tiles 20 to make up an equation. An example is [3]+[5]=[8]. The tiles 20 can be placed on the game board horizontally or vertically, not diagonally. A time limit for each play is decided upon before beginning play. Three or more tiles 20 can be used for each equation. The play proceeds clockwise. As each player completes his/her play, he/she announces aloud the math symbol being used-plus, minus times, etc. and the results and writes it on his/her personal score sheet. After the first play, each play must include one of the tiles 20 in use on the gameboard. The game is over when all tiles 20 have been placed or the game is "locked." (No further plays can be made) At that point, each player must subtract the total face value of their remaining tiles 20 from their total score. The player with the highest remaining total points is the winner.

BONUS points are earned when a player's tile 20 lands on a red square. Red squares are placed on the gameboard angled out from the center star toward each corner. When a player's tile lands on a red square, the value of that tile 20 is doubled when the score is added up. If a red square is used in another player's equation, it cannot be used again. Any player who uses all eight tiles 20 in one problem receives an additional 50 points and should be congratulated for a job well done.

NOTE: In the basic Crossmath game only one math symbol may be used to solve the desired equation (plus, minus, add, subtract). As math skills increase, and if all of the players agree, then play ADVANCED CROSSMATH in which any combination of symbols can be used to create challenges for even the most ardent player.

Although I have described an embodiment according to the invention with considerable details in the foregoing specification and illustrated it extensively in the drawings, it is to be understood that I may make changes in the structure of the device so long as any changes made remain within the scope of the appended claims and any changed devices similar to mine made by others that fall within my claim scope, I shall consider such devices to be my invention.

What is claimed is:

1. A mathematical board game comprising:
   (a) game rules for playing said mathematical board game;
   (b) a foldable game board having a substantially square playing surface on a first side, there being a surface on a second side, said playing surface side marked into a plurality of small similarly colored playing squares, there being a minimal number of said playing squares colored differently from said similarly colored squares spaced to radiate outwardly from a star design placed centrally on said playing surface, said star design with all said squares being mediums used for playing said game, said differently colored squares being bonus squares in accordance with said game rules, there being positions for two to four players along edges of said game board;
   (c) a plurality of tiles, said tiles being approximately ¾ inches square by ⅛ inch thick, each of said tiles sized to rest over covering each of said playing squares, each tile having a number designation on one wide surface side with an opposite wide surface side being blank, said number designation including numerals one through zero, said tiles for said game being 100 in number;
   (d) tile racks, at least one for each player, said tile racks being one piece having a slanted top surface, said tile racks having a flat bottom surface, said tile racks of a length to hold up to eight of said tiles aligned along said slanted top surface positioned with said numbered surface side up.

2. The mathematical game of claim 1 wherein said game is housed in a box, said box having a removable lid, an inside spacer, a bottom section.

3. The mathematical game of claim 1 wherein said game rules are a single sheet housed inside a box used for storage of said parts.

* * * * *